United States Patent [19]
Bivens et al.

[11] Patent Number: 5,393,137
[45] Date of Patent: Feb. 28, 1995

[54] DAMPER ASSEMBLY

[75] Inventors: Steven L. Bivens, Kankakee; Martin A. Witt, Tinley Park, both of Ill.

[73] Assignee: Illinois Tool Works Inc., Glenview, Ill.

[21] Appl. No.: 74,968

[22] Filed: Jun. 11, 1993

[51] Int. Cl.⁶ ............................................. A47B 88/12
[52] U.S. Cl. .............................. 312/332; 312/334.16; 296/37.9; 384/22; 384/23; 384/37; 384/9
[58] Field of Search ....................... 312/334.16, 334.36, 312/332; 296/37.9, 37.12; 384/22, 23, 37, 9

[56] References Cited

U.S. PATENT DOCUMENTS

| | | | |
|---|---|---|---|
| 419,496 | 1/1890 | Brown | 312/332 |
| 873,914 | 12/1907 | Vikoren | 312/332 |
| 3,008,790 | 11/1961 | Simons | 312/332 |
| 3,351,406 | 11/1967 | Ropiequet | 312/332 |
| 3,460,876 | 8/1969 | De Boer | 296/37.9 X |
| 3,477,770 | 11/1969 | Niemi | 384/23 |
| 3,521,938 | 7/1970 | Emaus | 296/37.9 X |
| 3,586,394 | 6/1971 | Hecksel | 384/23 |
| 3,813,132 | 5/1974 | Sahm | 312/334.16 X |
| 3,927,918 | 12/1975 | Dabbratz | 384/23 |
| 4,986,674 | 1/1991 | Decker | 384/23 X |

FOREIGN PATENT DOCUMENTS

| | | | |
|---|---|---|---|
| 975646 | 7/1975 | Canada | 296/37.9 |
| 341426 | 11/1989 | European Pat. Off. | 296/37.9 |
| 1193165 | 10/1959 | France | 312/334.16 |
| 147932 | 9/1982 | Japan | 296/37.9 |
| 71732 | 4/1987 | Japan | 296/37.9 |

*Primary Examiner*—Kenneth J. Dorner
*Assistant Examiner*—David E. Allred
*Attorney, Agent, or Firm*—Schwartz & Weinrieb

[57] ABSTRACT

A damper assembly includes anti-rattle tracking devices or components for preventing rattling and play when a sliding tray is moved into and out from a stationary housing by a damper device. The damper device further includes a fail-safe locking device so as to maintain the assembly of the locking device for the sliding tray regardless of either a pushing or pulling motion.

20 Claims, 5 Drawing Sheets

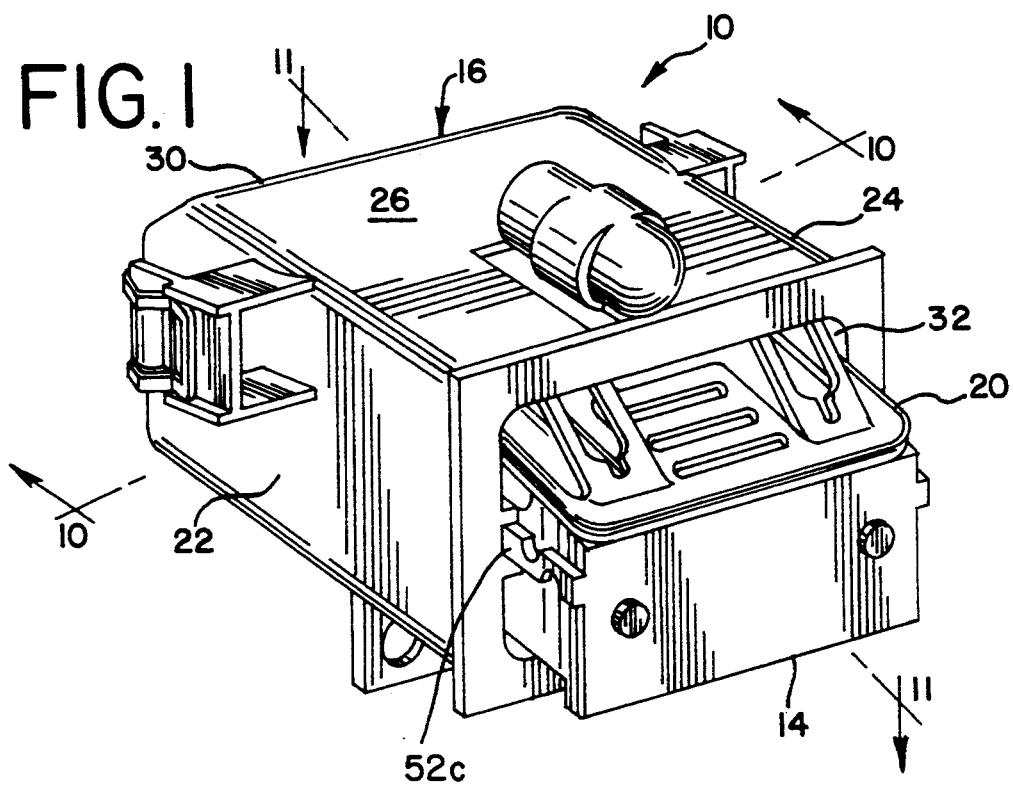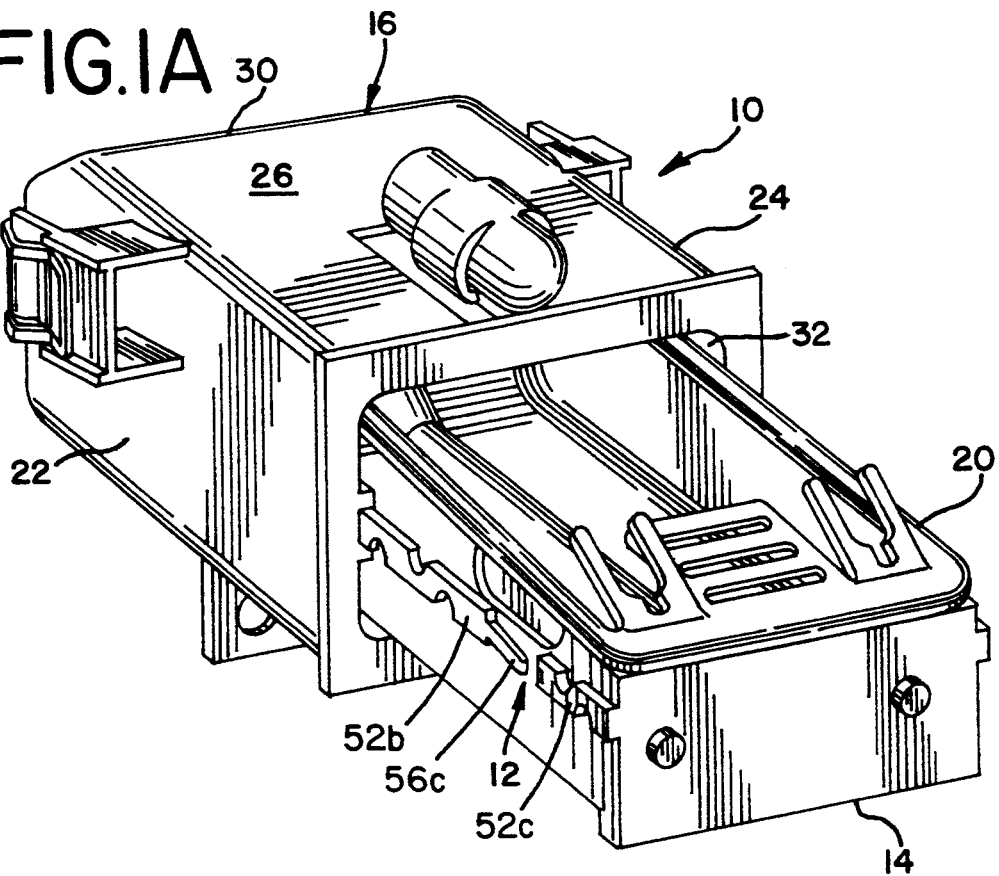

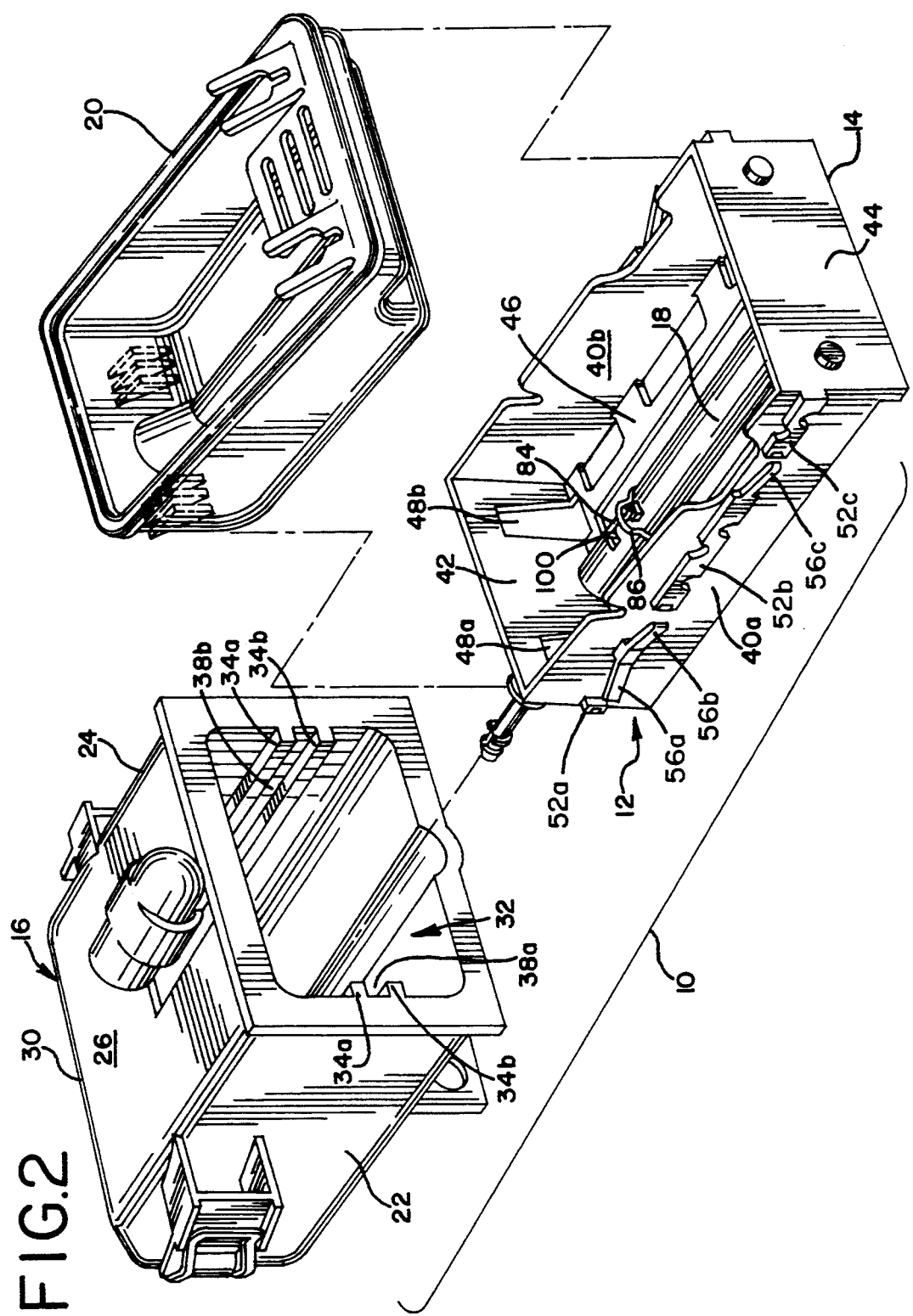

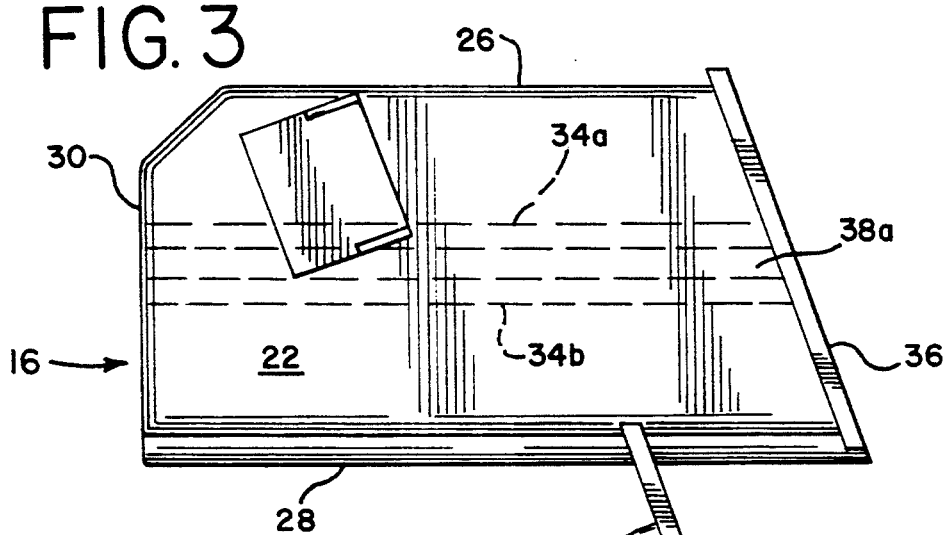
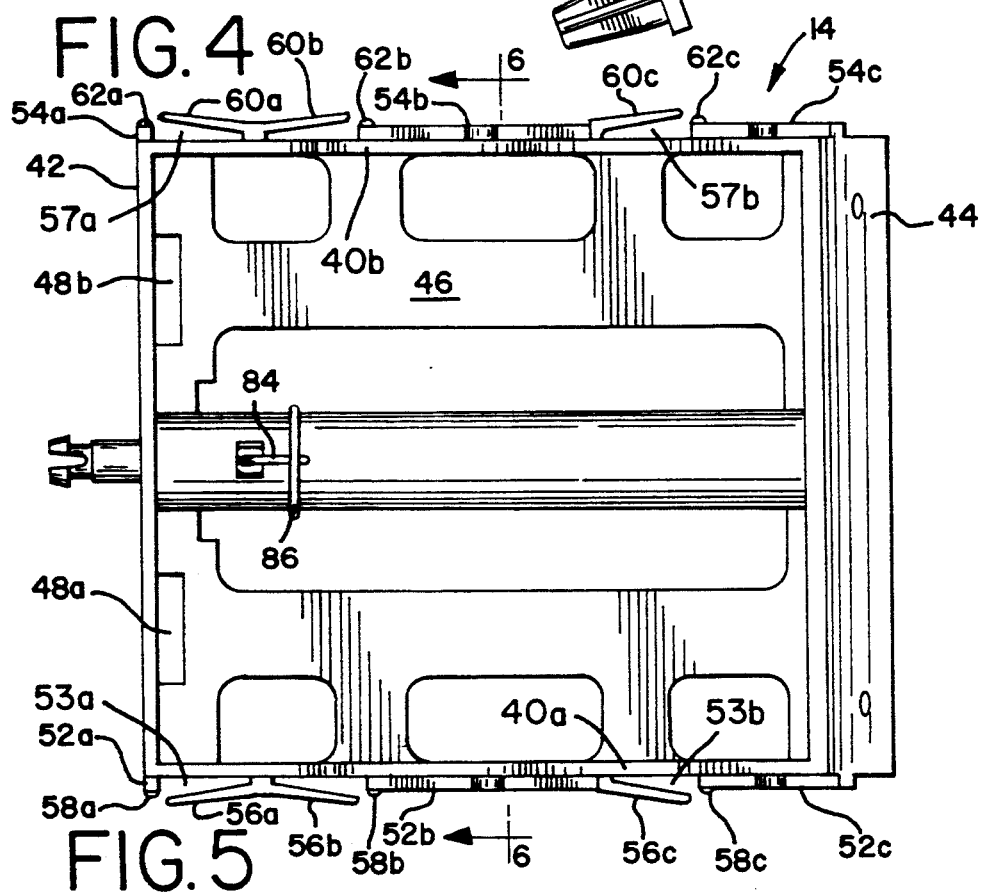
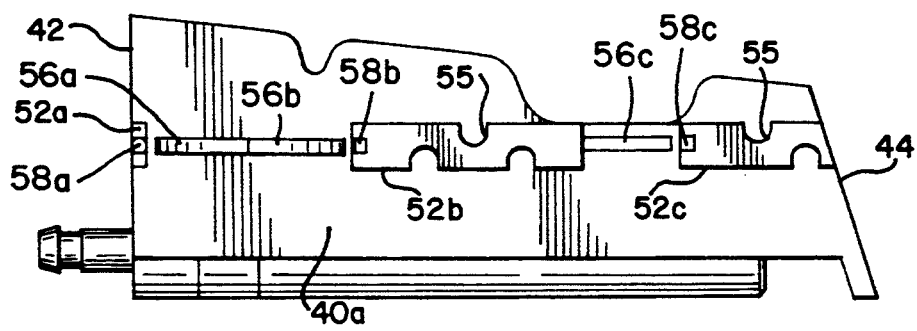

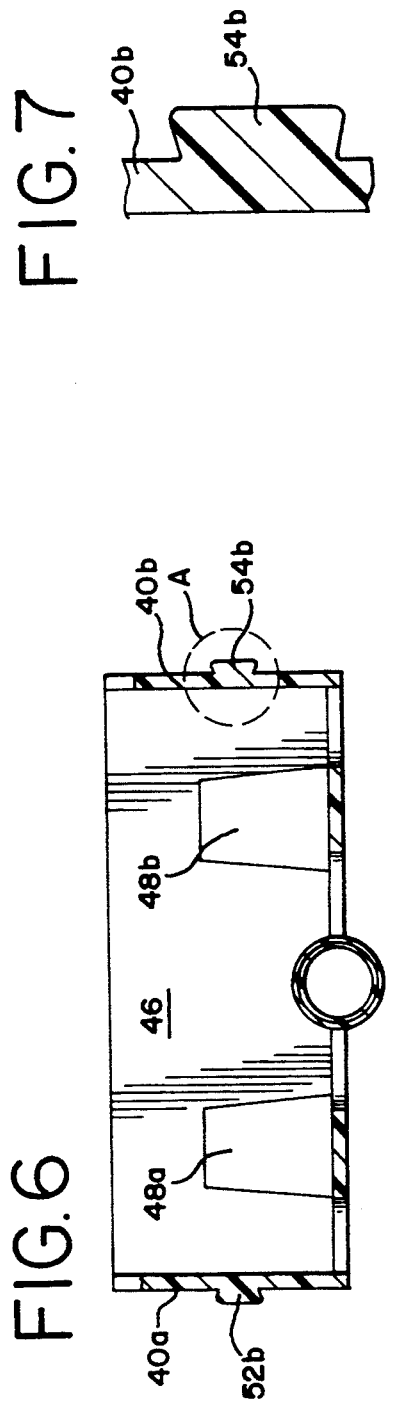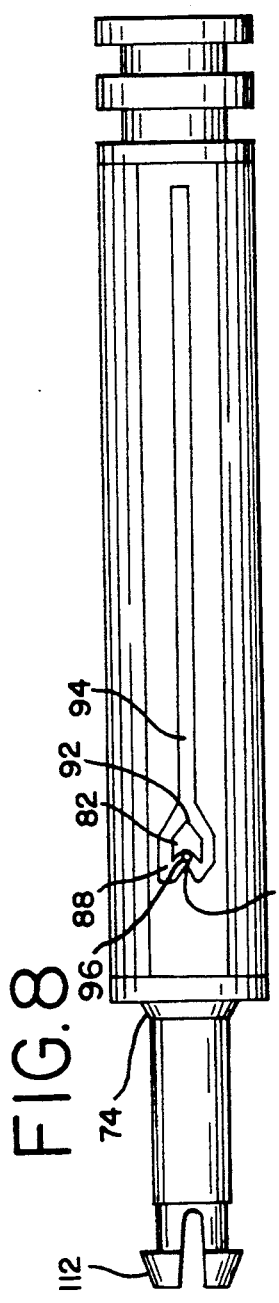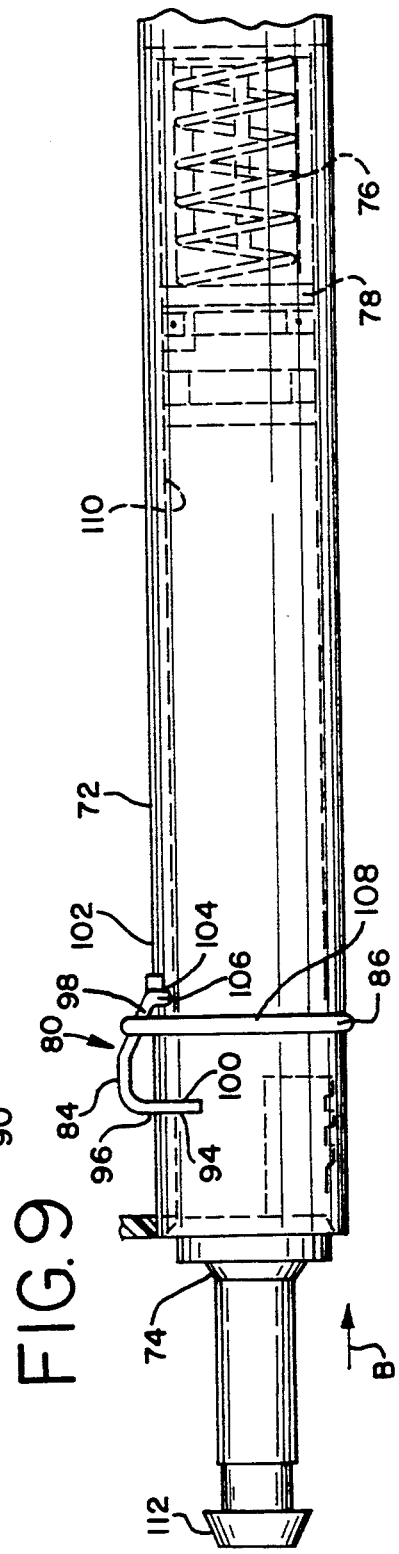

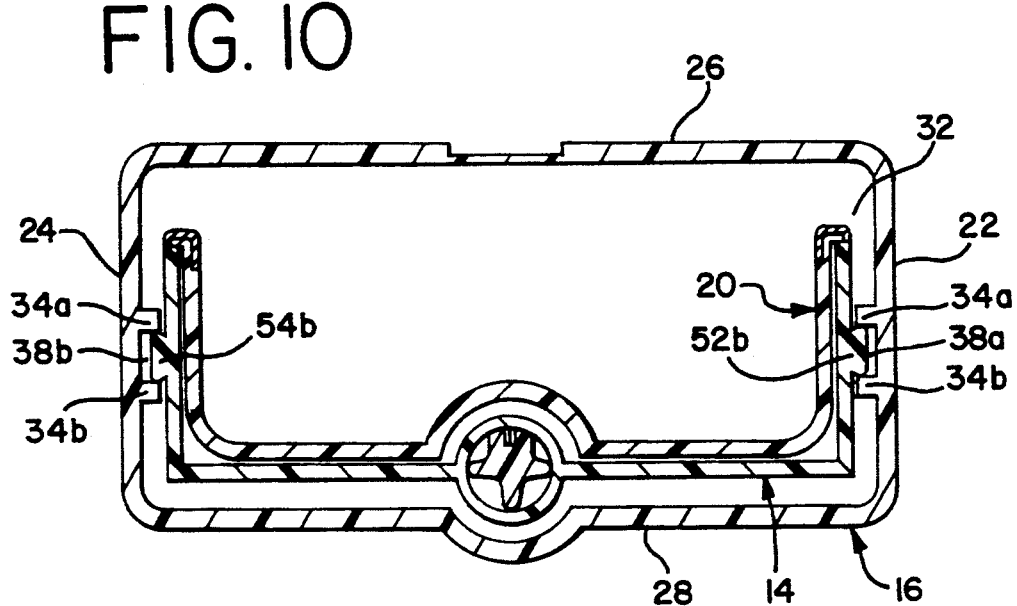
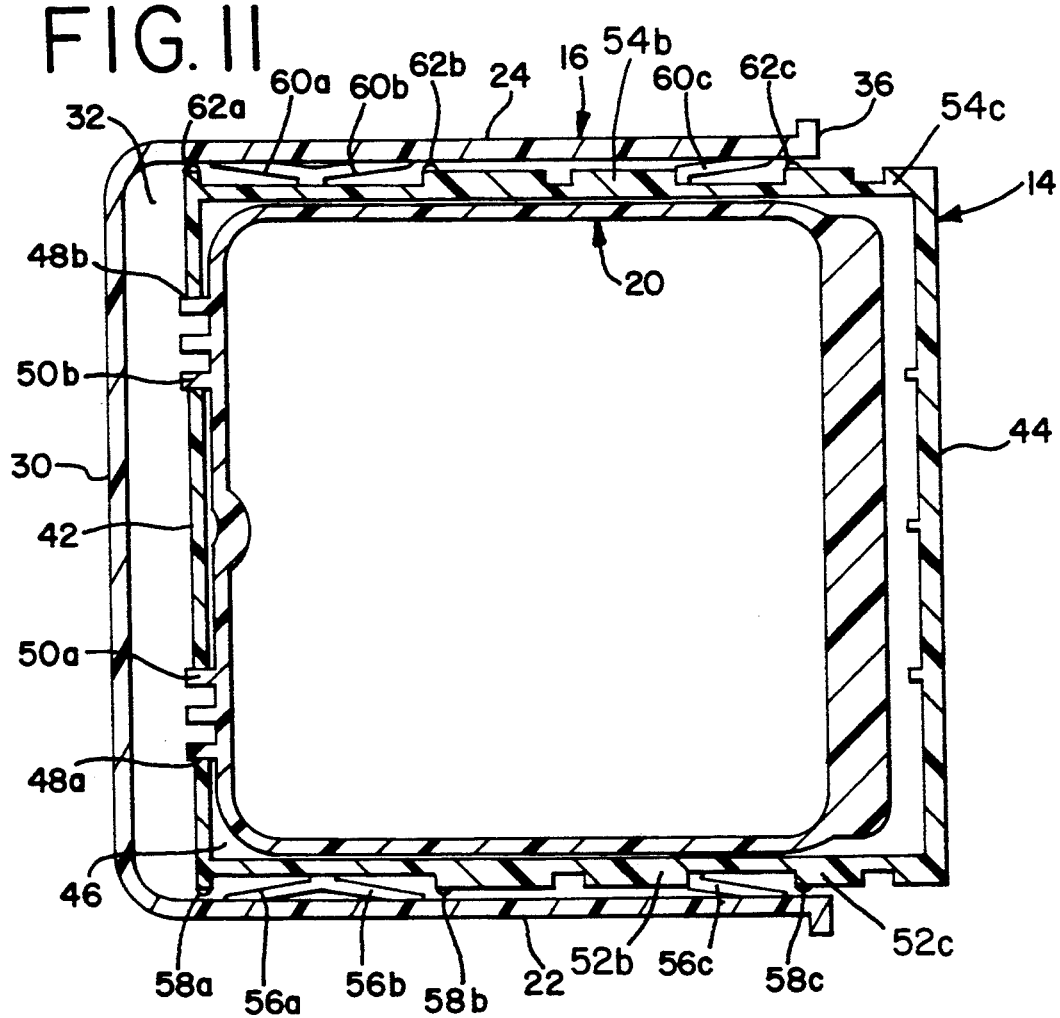

DAMPER ASSEMBLY

BACKGROUND OF THE INVENTION

1. Field of the Invention

This invention relates generally to damper devices for dampening the opening of an openable object such as a door, ashtray, chest or the like relative to a main body. More particularly, the present invention relates to an improved damper assembly of a unique construction which includes anti-rattle tracking means for preventing rattling and play when a sliding part is moved in and out of a stationary housing by a damper device.

2. Description of the Prior Art

As is generally known in the art, if an openable object is allowed to move too freely relative to its main body, play and rattle will be produced therebetween which creates an unpleasing effect. Further, when the openable object is a sliding ashtray installed in the dashboard of an automotive vehicle, such play and rattle may cause the contents therein to be tossed or scattered all over the passenger, seat and floor of the vehicle. In order to avoid this type of problem, attempts have been made heretofore by utilizing a large amount of friction between the openable object and the main body so as to eliminate such play and rattle. However, this solution is unsatisfactory in a dampened system type of design since the damper device is required to be driven by a low force damped spring assembly in order to effect a slow and smooth consistent movement of the sliding part. As a result, there is needed a high amount of variable force so as to pull the sliding part from the stationary part.

There is also known in the prior art a damper device having a "push-push" type of locking device formed by means of a heart-shaped cam part, a follower pin, and a retaining clip as is shown and described in U.S. Pat. No. 4,948,103 to Patrick J. Bowden et al. issued on Aug. 14, 1990, which is assigned to the same assignee as in the present invention. In FIG. 4 of the '103 patent which is hereby incorporated by reference, the follower pin 24 has a first leg portion 58 which is retained within the V-shaped portion 52 of the cam part 22 so as to lock the piston rod 14 in a closed position within the interior of the body member. In order to release the piston rod from the closed position, the piston rod must be pushed slightly to move it further into the body member. However, if the piston rod is pulled instead of being pushed, the first leg portion 58 of the follower pin 24 will be forced downwardly into the cam part area and the second leg portion 60 of the pin will be forced upwardly out of the small aperture 64. As a result, the follower pin 24 will become disassembled and thus non-functional.

In U.S. Pat. No. 4,629,167 to S. Kimura et al. issued on Dec. 16, 1986, there is disclosed a piston-cylinder type damper which includes a cylinder 11 connected to either a main body or an openable object, and a piston 12 connected to the other one of the pair of components comprising the main body and the openable object and adapted to fit into the cylinder 11. The piston 12 incorporates therein a check valve 16 adapted to allow the air in the cylinder to escape from the cylinder interior while the piston is driven into the cylinder by the movement of the openable object. On the other hand, when the piston is being withdrawn from the cylinder the check valve is kept closed thereby creating the dampening action.

It would therefore be desirable to provide a damper assembly of a unique construction like that of the present invention which includes anti-rattle tracking means so as to prevent play and rattle when the sliding part is moved into and out of the stationary part by a damper device. It would also be expedient to provide the damper device used in the damper assembly with a fail-safe locking means so as to maintain the assembly of the locking means regardless of either a pushing or pulling motion. The damper assembly of the present invention represents a significant improvement over the dampening devices described in the aforementioned '103 and '167 patents.

OBJECTS OF THE INVENTION

Accordingly, it is a general object of the present invention to provide an improved damper assembly having anti-rattle tracking means which is relatively simple and economical to manufacture and assemble.

It is an object of the present invention to provide an improved damper assembly which includes anti-rattle tracking means for preventing rattle and play when a sliding part is moved in and out of a stationary part by a damper device.

It is another object of the present invention to provide an improved damper assembly which includes a damper device having a fail-safe locking means so as to maintain the assembly of the locking means regardless of either a pushing or pulling motion.

SUMMARY OF THE INVENTION

In accordance with these aims and objectives, there is provided in accordance with a preferred embodiment of the present invention an improved damper assembly which includes a stationary housing, a sliding tray, and anti-rattle tracking means for eliminating play and rattling between the stationary housing and the sliding tray during movement of the tray between a first position and a second position. The stationary housing is formed of a pair of side walls, a top wall, a bottom wall, and a rear wall so as to define an interior cavity. The sliding tray is formed of a pair of side walls, a rear wall, and a front wall for receiving a receptacle. The interior cavity of the stationary housing slidably receives the sliding tray for movement between the first position and the second position.

The anti-rattle tracking means includes a pair of parallel, spaced-apart rails formed on each of the side walls of the stationary housing so as to define first and second channels therebetween, a plurality of track sections formed on each of the side walls of the sliding tray which are adapted to fit in the first and second channels, flexible fingers disposed between adjacent ones of the plurality of track sections, and a plurality of spacer bumps formed on the plurality of track sections. The flexible fingers and the spacer bumps limit the side-to-side movement of the sliding tray in a horizontal plane in order to control the play and rattle between the sliding tray and the stationary housing.

BRIEF DESCRIPTION OF THE DRAWINGS

These and other objects and advantages of the present invention will become more fully apparent from the following detailed description when read in conjunction with the accompanying drawings with like reference numerals indicating corresponding parts throughout the several views, wherein:

FIG. 1 is a perspective view of a damper assembly, constructed in accordance with the principles of the present invention, illustrating the components in the locked or closed position;

FIG. 1A is a perspective view similar to FIG. 1, but illustrating the components in the unlocked or opened position;

FIG. 2 is an exploded, perspective view of the present damper assembly;

FIG. 3 is a side elevational view of the stationary housing;

FIG. 4 is a top plan view of the sliding tray with the damper device in its unlocked or opened position;

FIG. 5 is a side elevational view of the sliding tray of FIG. 4;

FIG. 6 is a cross-sectional view, taken along the lines 6—6 of FIG. 4;

FIG. 7 is an enlarged view of the encircled area A of FIG. 6;

FIG. 8 is a top plan view, illustrating the essential parts of the locking means of the damper device in a locked or closed position;

FIG. 9 is a side elevational view of FIG. 8 with some parts shown in cross-section;

FIG. 10 is a cross-sectional view, taken along the lines 10—10 of FIG. 1; and

FIG. 11 is a cross-sectional view, taken along the lines 11—11 of FIG. 1.

DESCRIPTION OF THE PREFERRED EMBODIMENT

Referring now in detail to the various views of the drawings and in particular to FIGS. 1, 1A, 2, 10 and 11, there is shown a damper assembly 10 of the present invention which includes an anti-rattle tracking system 12 for preventing rattling and play when an openable object such as sliding tray 14 is moved into and out of a main body such as a stationary ashtray housing 16 mounted in a dashboard of an automotive vehicle (not shown) by a damper device 18. It will be noted that the sliding tray 14 is adapted to hold an ashtray receptacle 20 therein. The damper device 18 causes the sliding tray 14 containing the ashtray receptacle 20 to be gently or smoothly pushed out (opened) at a dampened or controlled rate of speed when activated and to be pushed in (closed position) at an undampened or higher rate of speed with a reduced force.

The stationary housing 16 is formed so as to have a generally rectangular configuration and includes a pair of side walls 22 and 24, a top wall 26, a bottom wall 28, and a rear wall 30 so as to define an interior cavity 32 for receiving the sliding tray 14 with the ashtray receptacle 20 secured therein. Each of the opposed side walls 22 and 24 is provided on its interior surface with a pair of parallel, spaced-apart rails 34a and 34b protruding therefrom. The rails 34a and 34b on the side wall 22 are in vertical alignment with the corresponding rails on the side wall 24.

As best seen from FIG. 3, the rails 34a and 34b on the side walls 22 and 24 extend longitudinally from the rear wall 30 of the housing 16 to the opened front end 36 thereof. Further, there are provided corresponding channels 38a and 38b defined by the parallel rails 34a and 34b on each side of the side walls for slidably supporting the sliding tray 14 with minimal friction during its forward and rearward movement, as will be presently discussed.

While the rails 34a and 34b extend inwardly from the respective side walls, it should be apparent to those skilled in the art that they may alternately be made to extend outwardly from the side walls of the housing. In addition, it should be noted that the rails 34a and 34b in the side walls are formed without a draft or taper.

As can be seen from FIGS. 4–7 of the drawings, the sliding tray 14 is also formed so as to have a generally rectangular shape and includes a pair of side walls 40a and 40b, a rear wall 42, and a front wall 44 so as to define a chamber 46 for receiving the ashtray receptacle 20. The rear wall 42 of the sliding tray has a pair of L-shaped cut-out portions 48a, 48b for receiving corresponding ears or projections 50a, 50b (FIG. 11) on the ashtray receptacle 20 so as to facilitate retention of the ashtray receptacle within the chamber 46.

The side wall 40a is provided with track sections 52a, 52b, 52c each having a dovetail cross-section so as to fit into the channel 38a formed in the side wall 22 of the housing. Similarly, the side wall 40b is formed with track sections 54a, 54b, and 54c each having a dovetail cross-section so as to fit into the channel 38b formed in the side wall 24 of the housing. The unique dovetail design of the track sections 52a–52c and 54a–54c allow for minimal frictional engagement and thus reduce contact between the respective track sections and the corresponding rails 34a and 34b. As a result, the up and down movement of the sliding tray 14 in the vertical plane is restricted so as to eliminate play and rattle. Thus, it can be seen that the track section and the rails cooperate to define a part of the anti-rattle tracking system 12 of the present invention. It should also be noted that certain ones of the track sections such as 52b, 52c, 54b, and 54c are provided with semi-circular cut-out portions or notches 55 so as to prevent warpage due to temperature changes. It is further noted that the track sections 52a, 52b, and 52c are spaced with respect to each other so as to define, along with side wall 40a, recesses 53a and 53b therebetween. Similarly, track sections 54a, 54b, and 54c are spaced with respect to each other so as to define, along with side wall 40b, recesses 57a and 57b therebetween.

The side wall 40a further includes a plurality (three) of flexible fingers 56a, 56b, and 56c each formed of a relatively small narrow strip extending resiliently in an outward direction. The flexible fingers 56a and 56b are located within recess 53a between the track sections 52a and 52b, and the flexible finger 56c is located within recess 53b between the track sections 52b and 52c. A plurality (three) of spacer bumps 58a, 58b, and 58c are provided, each being formed on a corresponding one of the track sections 52a–52c. Similarly, the side wall 40b further includes a plurality (three) of flexible fingers 60a, 60b, and 60c each formed of a relatively small narrow strip extending resiliently in an outward direction. The flexible fingers 60a and 60b are located within recess 57a between the track sections 54a and 54b, and the flexible finger 60c is located within recess 57b between the track sections 54b and 54c. A plurality (three) of spacer bumps 62a, 62b, and 62c are provided, each being formed on a corresponding one of the track sections 54a–54c.

The bumps 58b and 62b are preferably located on the respective track sections 52b and 54b so that they will be disposed just inside the front end 36 of the housing 16 when the sliding tray 14 is in the opened position. Further, the bumps 58c and 62c are also located on the corresponding track sections 52c and 54c so that they will be disposed just inside the front end 36 of the housing when the sliding tray is in the closed position.

The unique design of the flexible fingers 56a–56c and 60a–60c and the spacer bumps 58a–58c and 62a–62c control the side-to-side movement of the sliding tray 14 in the horizontal plane so as to eliminate play and rattle. When the sliding tray 14 is centered in the housing 12, the distal ends of the flexible fingers will be in contact engagement with the interior of the side walls within the channels 38a and 38b, but a slight predetermined gap or space will exist between the spacer bumps 58a–58c and 62a–62c and the side walls (FIG. 11). However, when the forces are strong enough to overcome the spring force of the flexible fingers, the bumps will function so as to provide a positive stop for the side-to-side play. Accordingly, it can be seen that the flexible fingers and spacer bumps cooperate with the side walls in the channels so as to form the other part of the anti-rattle tracking system 12 of the present invention.

In FIGS. 8 and 9, there is shown in detail the damper device 18 for causing the sliding tray 14 to be gently or smoothly pushed out (opened) at a dampened or controlled rate of speed when activated and to be pushed in (closed) at an undampened or higher rate of speed with a reduced force. The damper device 18 is comprised of cylindrically-shaped body member 72, a piston rod 74, a coil spring 76, and a one-way lip seal member 78. The damper device also includes a fail-safe push-pull locking means 80 formed by a heart-shaped cam part 82, a guide pin 84, and a retaining clip 86.

The heart-shaped cam part 82 of the locking means 80 is formed in the intermediate portion of the piston rod 74. A cam recess 88 is disposed around the cam part 82 which has a V-shaped portion 90 arranged at its left end (FIG. 8) and a tip surface 92 positioned at its right end. The tip surface 92 is formed adjacent a longitudinally-extending slot 94 defined within the outer surface of the piston rod 74. The guide pin 84 has an L-shaped configuration formed by a first leg portion 96 and a second leg portion 98.

The first leg portion 96 is inserted into the slot 94 by means of a rectangularly-shaped cut-out 100 formed within the side wall 102 of the body member 72 adjacent the opened end thereof. The cylindrically-shaped body member 72 further includes a small pivot point hole 104 positioned inwardly of the cut-out 100 for receiving a projection 106 formed integrally with the second leg portion 98 of the guide pin 84. The retaining clip 86 having a C-shaped design is adapted to be placed within arcuate grooves 108 disposed upon the outer surface of the side wall of the body member. The retaining clip 86 engages against the second leg portion 98 so as to permit its pivotal movement within the hole 104.

In this closed position of FIG. 8, it will be noted that the piston rod 74 is held or locked in place interiorly of the body member 72 until motion is required. As can be seen, the first leg portion 96 of the guide pin 84 is retained or locked within the V-shaped portion 90 of the cam part 82. In addition, the coil spring 76 has been compressed within a chamber 110 of the body member 72. In order to normally activate the damper device 18, the rear end 112 of the piston rod 74 is pushed slightly in the direction of arrow B (to the right) and then released so that the piston rod is moved further into the body member 72. As a result, the first leg portion 96 is caused to move in a counter-clockwise direction around the cam recess 88. This permits the coil spring 76 to push the piston rod 74 out from the body member 72 so as to produce a linear motion.

On the other hand, in the event the user makes the mistake of pulling on the rear end 112 of the piston rod rather than pushing it, the first leg portion 96 will be caused to flex upwardly and still permit travel in the counter-clockwise direction around the cam recess 88 when the mechanism is properly actuated. This action prevents the second leg portion 98 of the guide pin 24 from being disengaged from the pivot point hole 104 and thus rendering the damper assembly nonfunctional.

As will be noted, as a result of the location of the pivot hole 104 and the cut-out 100, the present invention has been rotated 180° from the position shown in FIGS. 4 and 5 of the prior art '103 patent. In this prior art damper device, when the piston rod is pulled instead of pushed, the first leg of the follower pin will be forced downwardly into the cam recess area and the second leg thereof will be forced out of its pivot point hole, thereby causing the follower pin to become disassembled. Accordingly, the damper device of the present invention has been designed with an improved locking means which maintain the assembly of the locking means regardless of either a pushing or pulling motion without causing a failure.

From the foregoing detailed description, it can thus be seen that the present invention provides an improved damper assembly which includes anti-rattle tracking means for preventing rattling and play when a sliding part is moved into and out from a stationary housing by a damper device. Further, a damper device is provided with a fail-safe locking means so as to maintain the assembly of the locking means regardless of either a pushing or pulling motion.

While there has been illustrated and described what is at present considered to be a preferred embodiment of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiment disclosed as the best mode contemplated for carrying out the invention, but that the invention will include all embodiments falling within the scope of the appended claims.

What is claimed is:

1. A damper assembly, comprising:

a stationary housing formed by a pair of side walls, a top wall, a bottom wall, and a rear wall so as to define an interior cavity open at the front end thereof;

a sliding receptacle formed by a pair of side walls, a rear wall, a bottom wall, and a front wall for slidable disposition within said interior cavity of said stationary housing between a first position and a second position; and anti-rattle tracking means, for eliminating play and rattling between said stationary housing and said receptacle during movement of said receptacle relative to said stationary housing between said first position and said second position, comprising a pair of parallel, spaced-apart rails formed upon each one of said side walls of said stationary housing so as to define first and second channels therebetween; a plurality of spaced and separated track sections fixedly mounted upon each one of said side walls of said receptacle for disposition within said first and second channels, and for defining, along with said side walls of said receptacle, recesses between said spaced and separated track sections; and flexible finger means, mounted directly upon each one of said side walls of said receptacle and disposed within said recesses defined between adjacent ones of said plurality of spaced and separated track sections, for engaging side wall portions of said stationary housing between said spaced-apart rails in a resiliently biased manner so as to limit side-to-side movement of said receptacle in a horizontal plane with respect to said stationary housing in order to control said play and rattling between said receptacle and said stationary housing.

2. A damper assembly as claimed in claim 1, wherein said anti-rattle tracking means further includes each of said plurality of track sections being formed of a dovetail cross-section so as to fit into said first and second channels with minimal frictional engagement for restricting up and down movement of said receptacle in a vertical plane.

3. The assembly as set forth in claim 1, further comprising:
spacer bumps formed upon said plurality of track sections for engaging said side wall portions of said stationary housing between said spaced-apart rails.

4. A damper assembly as claimed in claim 3, wherein certain ones of said spacer bumps are located on said plurality of track sections so that they are positioned just inside of the front end of said stationary housing when said receptacle is disposed at a first open position with respect to said stationary housing.

5. A damper assembly as claimed in claim 3, wherein certain ones of said spacer bumps are located on said plurality of track sections so that they are positioned just inside of the front end of said stationary housing when said receptacle is disposed at a second closed position with respect to said stationary housing.

6. A damper assembly as claimed in claim 1, further comprising damper means formed of a body member and a piston rod for controlling said sliding receptacle to be pushed out from said housing at a dampened rate of speed and to be pushed in at a higher rate of speed with a reduced force.

7. A damper assembly as claimed in claim 6, wherein said damper means includes fail-safe locking means for permitting the unlocking of said sliding receptacle from a closed position by either a pushing or pulling motion without a failure.

8. A damper assembly as claimed in claim 7, wherein said damper means is comprised of a cam part and a guide pin, said guide pin being retained in a V-shaped portion of said cam part in the closed position and being releasable therefrom when said piston rod is either being pushed into or pulled out from said body member.

9. A damper assembly, comprising:
housing means;
tray means slidably disposed within said housing means for movement between a closed position and an opened position;
anti-rattle tracking means for eliminating play and rattling between said housing means and said tray means during movement of said tray means between said closed position and said opened position; and damper means, interconnected between said tray means and said housing means, for controlling said tray means during movement of said tray means between said opened and closed positions such that said tray means is pushed outwardly from said housing means at a dampened rate of speed and is able to be pushed inwardly into said housing means at a higher undampened rate of speed,
said damper means comprising a cylinder having a closed end and an opened end; a piston having a first end disposed externally of said cylinder and a second end disposed internally within said cylinder; a cam system defined upon an outer surface portion of said piston; and a guide pin having a pivot end mounted upon an outer sidewall surface portion of said cylinder, and an engaging end projecting through said sidewall portion of said cylinder for engagement with said cam system of said piston; said pivot end of said guide pin being disposed toward said closed end of said cylinder, and said engaging end of said guide pin being interposed between said pivot end of said guide pin and said open end of said cylinder so as to define a fail-safe locking system between said guide pin and said cam system so as to maintain said guide pin and said cam system engaged regardless of whether said tray means is pushed or pulled with respect to said housing means when said tray means is disposed at said closed position.

10. A damper assembly as claimed in claim 9, wherein said anti-rattle tracking means includes a pair of parallel, spaced-apart rails respectively formed upon opposite side walls of said housing means to define first and second channels therebetween, a plurality of track sections formed on said tray means which are adapted to fit into said first and second channels, flexible finger means disposed between adjacent ones of said plurality of said track sections, and a plurality of spacer bumps formed on said plurality of tracking sections, said flexible finger means and said spacer bumps limiting side-to-side movement of said tray means in a horizontal plane in order to control the play and rattling between said tray means and said housing means.

11. A damper assembly as claimed in claim 10, wherein said anti-rattle tracking means further includes each of said plurality of track sections being formed of a dovetail cross-section so as to fit into said first and second channels with minimal frictional engagement for restricting up and down movement of said tray means in a vertical plane.

12. A damper assembly as claimed in claim 10, wherein certain ones of said spacer bumps are located on said plurality of track sections-so that they are positioned just inside of a front end of said housing means when said tray means is in the opened position.

13. A damper assembly as claimed in claim 10, wherein certain ones of said spacer bumps are located on said plurality of track sections so that they are positioned just inside of a front end of said housing means when said tray means is in the closed position.

14. The assembly of claim 9, wherein:
said cam system comprises a cam part having a substantially V-shaped configuration.

15. A damper assembly, comprising:
a stationary housing formed by a pair of side walls, a top wall, a bottom wall, and a rear wall so as to define an interior cavity open at the front end thereof;

a receptacle formed by a pair of side walls, a rear wall, a bottom wall, and a front wall for slidable disposition within said interior cavity of said stationary housing between a first position and a second position, and having a longitudinal axis; and anti-rattle tracking means, for eliminating play and rattling between said stationary housing and said receptacle during movement of said receptacle relative to said stationary housing between said first position and said second position, comprising a pair of parallel, spaced-apart rails formed upon each one of said side walls of said stationary housing so as to define first and second channels therebetween; a plurality of spaced and separated track sections fixedly mounted upon each one of said side walls of said receptacle for disposition within said first and second channels, said track sections being disposed within a first set of laterally spaced planes laterally spaced a first predetermined distance from said longitudinal axis; a plurality of spacer bumps mounted upon said plurality of track sections and disposed within a second set of laterally spaced planes laterally spaced a second predetermined distance from said longitudinal axis which is greater than said first predetermined distance; and flexible finger means, mounted upon each one of said side walls of said receptacle so as to be interposed between said track sections, and having ends thereof disposed in a third set of laterally spaced planes laterally spaced a third predetermined distance from said longitudinal axis which is greater than said second predetermined distance, for engaging side wall portions of said stationary housing between said spaced-apart rails in a resiliently biased manner so as to limit side-to-side movement of said receptacle in a horizontal plane with respect to said stationary housing in order to control said play and rattling between said receptacle and said stationary housing, said spacer bumps also engaging said side wall portions of said stationary housing between said spaced-apart rails so as to limit said side-to-side movement of said receptacle in said horizontal plane with respect to said stationary housing in order to control said play and rattling between said receptacle and said stationary housing when said ends of said flexible finger means are deflected laterally inwardly toward said longitudinal axis to a position within said second laterally spaced planes.

16. The assembly as set forth in claim 15, wherein:
each one of said track sections has a dove-tail shaped cross-sectional configuration for engaging said spaced-apart rails defining said channels with a minimal amount of friction so as to restrict vertical movement of said receptacle in a vertical plane with respect to said stationary housing.

17. The assembly as set forth in claim 15, wherein:
predetermined ones of said spacer bumps are located upon said plurality of track sections such that said predetermined ones of said spacer bumps are positioned just inside said front end of said stationary housing when said receptacle is disposed in an opened position.

18. The assembly as set forth in claim 15, wherein:
predetermined ones of said spacer bumps are located upon said plurality of track sections such that said predetermined ones of said spacer bumps are positioned just inside said front end of said stationary housing when said receptacle is disposed in a closed position.

19. The assembly as set forth in claim 15, further comprising:
damper means, interconnected between said receptacle and said stationary housing, for controlling said receptacle during movement of said receptacle between opened and closed positions such that said receptacle is pushed outwardly from said stationary housing at a dampened rate of speed and is able to be pushed inwardly into said stationary housing at a higher undampened rate of speed.

20. The assembly as set forth in claim 19, wherein:
said damper means comprises a cam component disposed upon a piston member; and
a guide pin mounted upon a cylinder housing said piston, wherein said guide pin is releasably retained within a V-shaped portion of said cam component when said receptacle is disposed in said closed position, and is released therefrom when said piston is pushed with respect to said cylinder so as to permit said receptacle to move to said opened position with respect to said stationary housing.

* * * * *